(12) United States Patent
Torres

(10) Patent No.: US 8,585,233 B1
(45) Date of Patent: Nov. 19, 2013

(54) TEMPORARY HEADLIGHT ASSEMBLY

(76) Inventor: Sachel Torres, Bronx, NY (US)

(*) Notice: Subject to any disclaimer, the term of this patent is extended or adjusted under 35 U.S.C. 154(b) by 0 days.

(21) Appl. No.: 13/539,784

(22) Filed: Jul. 2, 2012

(51) Int. Cl.
*F21L 4/00* (2006.01)

(52) U.S. Cl.
USPC .......................... 362/183; 362/546; 362/549

(58) Field of Classification Search
USPC ................................. 362/183, 507, 549, 546
See application file for complete search history.

(56) References Cited

U.S. PATENT DOCUMENTS

| | | | |
|---|---|---|---|
| 4,903,174 A | 2/1990 | Busby | |
| 5,010,454 A | 4/1991 | Hopper | |
| 5,150,284 A | 9/1992 | Dobert | |
| 5,797,672 A | 8/1998 | Dobert | |
| 6,565,241 B1* | 5/2003 | Glynn | 362/475 |
| 7,090,371 B1* | 8/2006 | Bonar | 362/183 |
| 7,463,136 B2 | 12/2008 | Ungerman | |
| 8,210,735 B2* | 7/2012 | Choi | 362/650 |
| 2008/0122608 A1 | 5/2008 | Plummer et al. | |
| 2008/0180238 A1 | 7/2008 | Plummer et al. | |
| 2012/0256543 A1* | 10/2012 | Marcove et al. | 315/77 |

* cited by examiner

*Primary Examiner* — Evan Dzierzynski
(74) *Attorney, Agent, or Firm* — Montgomery Patent & Design; Robert C. Montgomery

(57) ABSTRACT

A temporary headlight assembly that serves as a temporary emergency replacement for a motor vehicle headlight bulb with a body of a tapered design having large exterior threads that allow it to be screwed into the headlight bulb socket of a motor vehicle after a non-operational headlight bulb is removed. The universal mounting arrangement coupled with the variable size of the tapered threaded opening allows it to be used on almost any type of vehicle. The apparatus is powered by internal rechargeable batteries and controlled by a power switch, and can be recharged by a cigarette lighter adapter. The apparatus uses LED lamps to produce light.

7 Claims, 3 Drawing Sheets

TEMPORARY HEADLIGHT ASSEMBLY

RELATED APPLICATIONS

There are currently no applications co-pending with the present application.

FIELD OF THE INVENTION

The presently disclosed subject matter is directed to vehicle headlights. More particularly, the present invention relates to headlights for temporary and emergency use.

BACKGROUND OF THE INVENTION

Headlights are one of the most important pieces of safety equipment when driving at night. Not only do headlights allow drivers to see the road and obstacles ahead, but they also allow other drivers to see your vehicle. It is of the utmost importance to have properly operating headlights.

Unfortunately headlights sometimes fail. While a simple burnt-out lamp is the most common problem, other problems such as blown fuses, bad wiring, corroded sockets, and the like can also prevent headlights from working. Because of the importance of headlights to safety, quick repair is mandated. But repairs often require a time consuming trip to the repair shop. Should one be stopped by a law enforcement official because of a failed headlight a fine costing several times the repair costs may result. Thus a driver faces a dilemma, until his burnt-out headlight is fixed he is a danger while driving and chances receiving a ticket or he must refrain from driving until he can have his headlight fixed.

Accordingly, there exists a need for a temporary headlight that can function as a replacement for a non-operating motor vehicle headlight but which does not operate on the electrical system of the vehicle.

SUMMARY OF THE INVENTION

The principles of the present invention provide for a rechargeable headlight having a threaded body that is downwardly tapered along its length such that the front of the threaded body is narrower than its rear. Attached to the rear of the threaded body is a cylindrical battery housing that stores at least one (1) rechargeable battery. At the front of the threaded body is a light module for emitting light. A switch selectively applies power to the light module to emit light.

In practice the light module includes at least one LED, and operating power can be from the rechargeable battery or from power applied to a power jack. Power applied to the power jack can be used to recharge the rechargeable battery.

Beneficially the threaded body includes coarse outer threads that are disposed along its length. Those coarse outer threads allow the threaded body to be screwed into the headlight housing of a motor vehicle when the non-operational headlight is removed.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

| DESCRIPTIVE KEY | |
|---|---|
| 10 | temporary rechargeable headlight for motor vehicles |
| 15 | overall enclosure |
| 20 | threaded body |
| 25 | battery housing |
| 30 | coarse threads |
| 40 | ON/OFF switch |
| 45 | automobile power adapter |
| 50 | power plug |
| 55 | power jack |
| 57 | battery cable |
| 58 | battery clips |
| 60 | motor vehicle |
| 65 | headlight lens |
| 70 | rechargeable batteries |
| 75 | window or door opening |
| 80 | high intensity LED modules |
| 85 | heat sink assembly |
| 90 | light rays |
| 105 | LED driver assembly |
| 110 | charging regulator circuit |

DETAILED DESCRIPTION OF THE PREFERRED EMBODIMENT

The best mode for carrying out the invention is presented in terms of its preferred embodiment, herein depicted within FIGS. 1 through 4, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
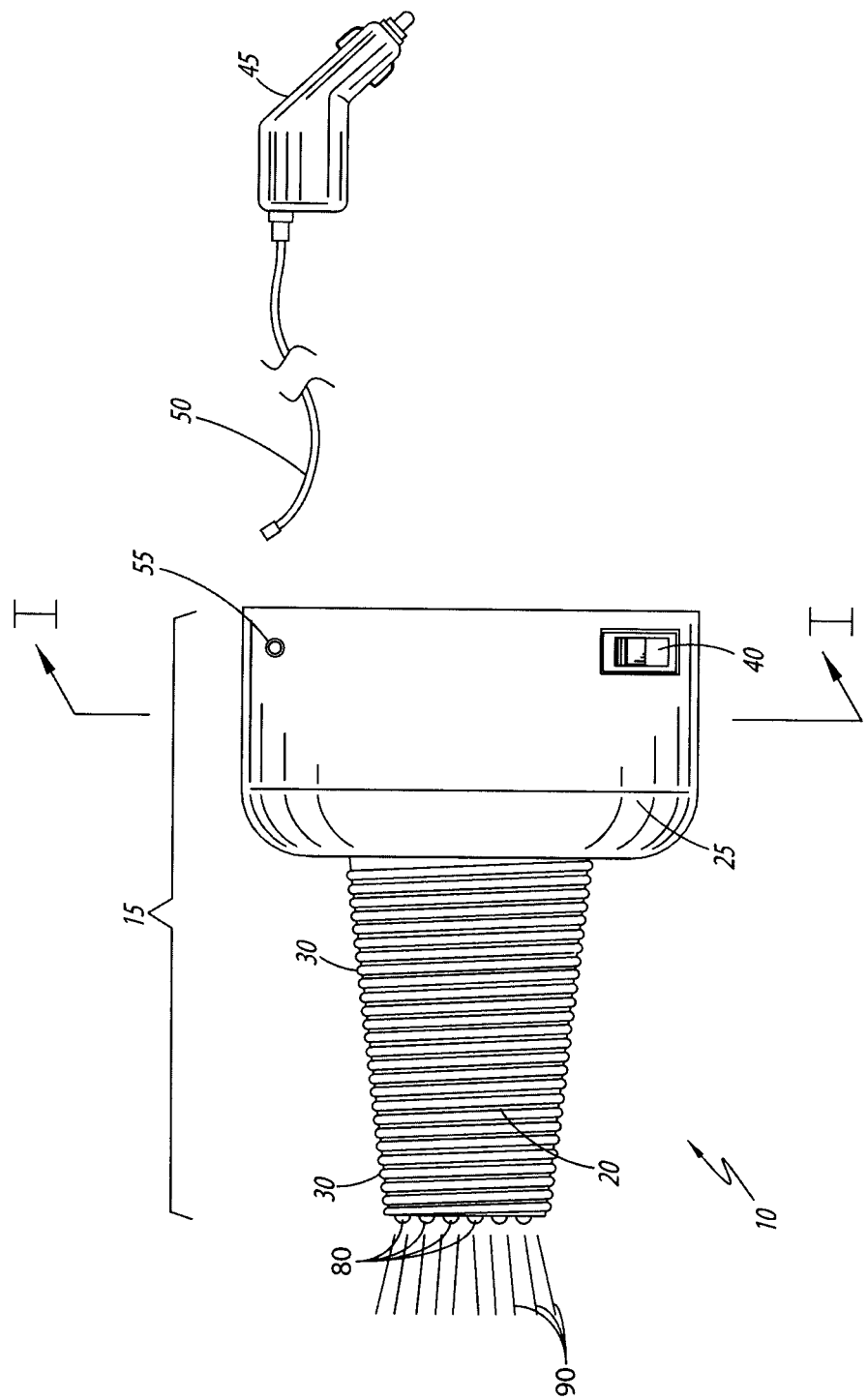
FIG. 1 is a side view of the temporary rechargeable headlight 10 according to the preferred embodiment of the present invention.

Refer now to FIG. 1, which is a side view of a temporary rechargeable headlight 10 according to the preferred embodiment of the present invention. The rechargeable headlight 10 includes an enclosure 15 having a threaded body 20 that is located at the front of the temporary rechargeable headlight 10 and a battery housing 25 that is located at the rear. The battery housing 25 is cylindrical and includes an internal volume that is sufficient to store several rechargeable batteries 70 (see FIGS. 3 and 4).

The threaded body 20 tapers downward from the battery housing 25 and has coarse outer threads 30 disposed along its length. The threads 30 combined with the taper enable the threaded body 20 to be screwed into most motor vehicle headlight bulb sockets after the original headlight bulb is removed. When operating, the temporary rechargeable headlight 10 produces light 90 which emanates from an LED module 80 that is located at the front of the threaded body 20.

Still referring to FIG. 1, operation of the temporary rechargeable headlight 10 is controlled by an ON/OFF switch 40 that is located toward the rear of the battery housing 25. As the temporary rechargeable headlight 10 is rechargeable, recharge power is applied to the temporary rechargeable headlight 10 by an automobile power adapter 45 with a power plug 50 and by a power jack 55. The power jack 55 is also located toward the rear of the battery housing 25. While the temporary rechargeable headlight 10 is primarily intended for use as a temporary replacement headlight assembly for use on motor vehicles, it may also be used as a conventional high-intensity flashlight by grasping it in one's hand around the battery housing 25 and aiming the threaded body 20 to provide portable illumination 90. Such versatility makes the temporary rechargeable headlight 10 ideal for carrying in almost any motor vehicle where it can safely provide the aforementioned dual functionality.

Figure 2:
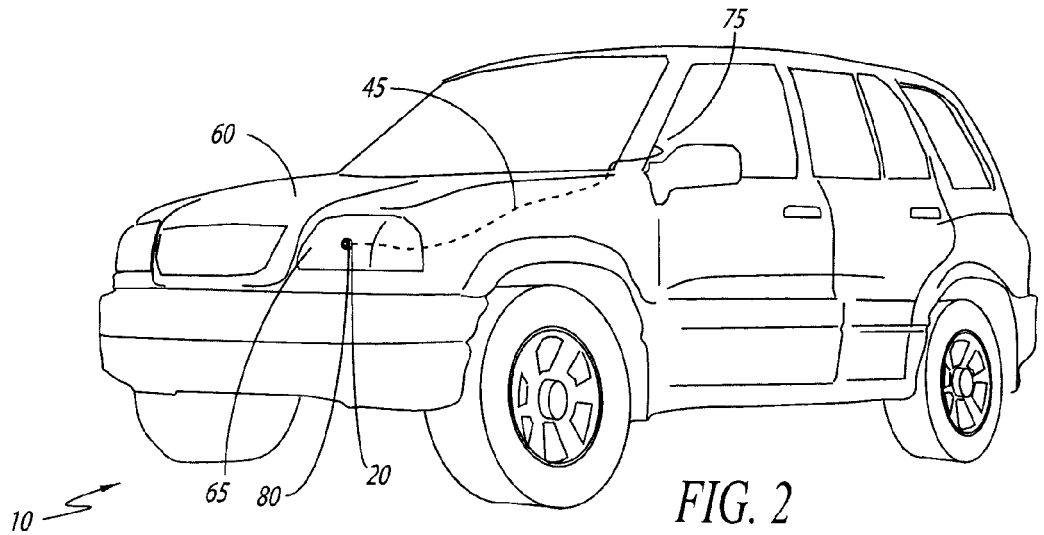
FIG. 2 is an isometric view of the temporary rechargeable headlight 10 shown in FIG. 1 being used on a motor vehicle 60.

Refer next to FIG. 2, an isometric view of the temporary rechargeable headlight 10 shown in use on a motor vehicle 60, depicted as a sport utility vehicle. It should be noted that the temporary rechargeable headlight 10 can be used with equal effectiveness on any type of motor vehicle including passenger vehicles, vans, pickup trucks, buses, tractor-trailer rigs, emergency vehicles, or the like.

As shown, the temporary rechargeable headlight 10 is installed in a bulb socket of an original equipment headlight lens 65 are removal of the original bulb. The threaded body 20, (see FIG. 1) is hand tightened into the bulb socket of the headlight lens 65. This places the LED modules 80 in position to illuminate road surfaces. In FIG. 2 the temporary rechargeable headlight 10 is shown using the automobile power adapter 45 to enable extended usage. However the temporary rechargeable headlight 10 also has internal rechargeable batteries 70 (see FIGS. 3 and 4) which can provide approximately seven hours (7 hrs.) of operating time. Should longer operating times be needed, the automobile power adapter 45 can be connected via the power plug 50 and the power jack 55 to a vehicle 60 power outlet. For example, as shown the automobile power adapter 45 can be routed through a window or door opening 75 of the motor vehicle 60.

Figure 3:
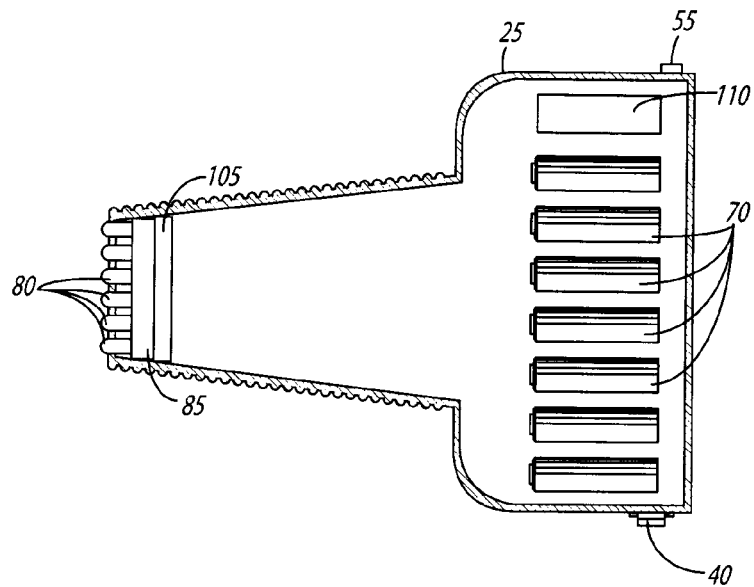
FIG. 3 is a sectional view of the temporary rechargeable headlight 10 taken along line I-I of FIG. 1; and, FIG. 4 is an electrical schematic block diagram depicting major electrical components of the temporary rechargeable headlight 10 shown in FIGS. 1-3.

Refer now to FIG. 3, a sectional view of the temporary rechargeable headlight 10 taken along line I-I of FIG. 1. The temporary rechargeable headlight 10 includes a plurality of heavy duty rechargeable batteries 70 that are housed in the battery housing 25. The temporary rechargeable headlight 10 produces light 90 using high intensity LED modules 80 that are beneficially mounted on a heat sink 85. The battery housing 25 also houses an LED driver assembly 105 and a charging regulator circuit 110 whose functionality is described in greater detail herein below.

Figure 4:
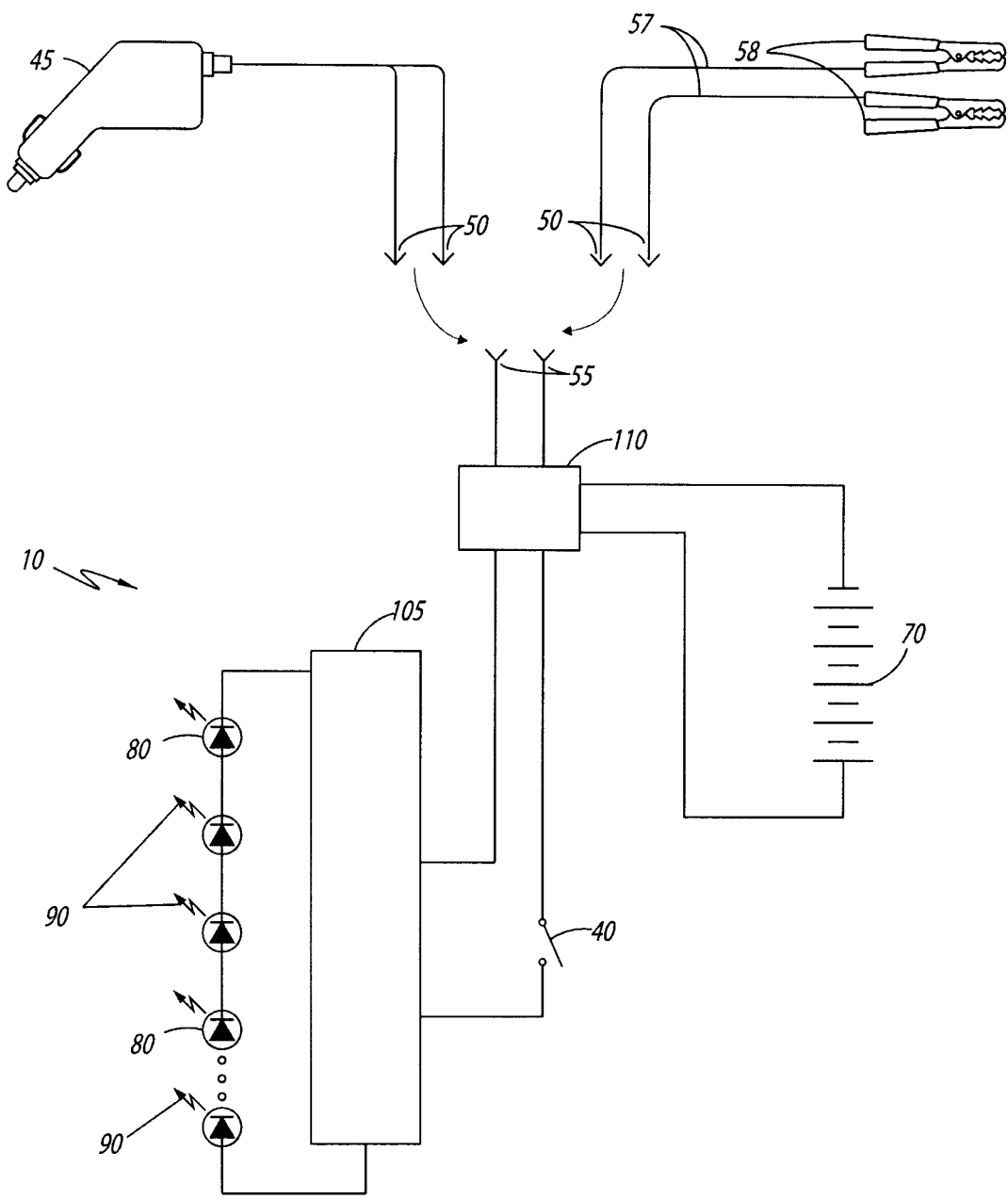

Referring finally, to FIG. 4, an electrical schematic block diagram depicting the major electrical components in the temporary rechargeable headlight 10, power is applied from the power adapter 45 via the power plug 50 to the power jack 55. That power is applied to a charging regulator 110. The charging regulator circuit 110 provides a regulated voltage and a controlled current to recharge the rechargeable batteries 70. Power is also routed to the ON/OFF switch 40, which is controlled by a user. From the ON/OFF switch 40 power is selectively applied to the LED driver assembly 105. The LED driver assembly 105 to applies controlled power to the high intensity LED modules 80.

Still referring to FIG. 4, the temporary rechargeable headlight 10 beneficially includes an auxiliary battery cable 57 that can be attached to a standard vehicle battery via integral battery clips 58. The battery cable 57 provides similar electrical charging functions and connections to the power jack 55 as the previously described power adapter 45.

It is envisioned that other styles and configurations of the present invention can be easily incorporated into the teachings of the present invention. While only one particular configuration is shown and described that is for purposes of clarity and disclosure and not by way of limitation of scope.

The preferred embodiment of the present invention can be utilized by the common user in a simple and effortless manner with little or no training. It is envisioned that the temporary rechargeable headlight 10 would be constructed in general accordance with FIG. 1 through FIG. 4. It is also envisioned that the body 20 and battery housing 25 are constructed of high impact resistant plastic in an injection molding process. The LED driver assembly 105 and the charging regulator circuit 110 would be designed to produce the necessary illumination levels given the power and time operating requirements.

Prior to use, the temporary rechargeable headlight 10 should be adequately charged by connecting the power adapter 45 and the power plug 50 to the power jack 55 for an adequate period of time, envisioned as being several hours. Alternately, charging can be performed using the battery cable 57 by connecting the power plug 50 of the battery cable 57 into the power jack 55 and the battery clips 58 to the vehicle's battery. Following an adequate charging time, the temporary rechargeable headlight 10 is ready for use and it can be safely stored in a motor vehicle 60 for use as required.

Actual use of the temporary rechargeable headlight 10 is envisioned to occur in two (2) circumstances. The first would be when the user requires temporary illumination 90 of that provided by a conventional flashlight. The temporary rechargeable headlight vehicles 10 provides such functionality by holding it in one's and activating the ON/OFF switch 40 to produce a powerful beam of light 90. This functionality is highly useful when performing roadside repairs, helping other motorists, signaling for help, or similar functions which are provided by a conventional flashlight.

The second circumstance when the functionality of the temporary rechargeable headlight 10 is needed is to replace a non-operating headlight of the motor vehicle 60. The user would first remove the original headlight bulb from the headlight lens 65. The user would next screw the threaded body 20 of the temporary rechargeable headlight 10 into the bulb socket of the headlight lens 65 such that the threaded body 20 and LED modules 80 project forwardly with regards to the motor vehicle 60. The user would then turn the ON/OFF switch 40 to ON to produce high intensity light 90. If the functionality of the temporary rechargeable headlight 10 is only needed for a short time, say less than seven hours (7 hrs.), the temporary rechargeable headlight 10 would operate using the electrical power provided by the rechargeable batteries 70. Should a longer operating cycle be required, the temporary rechargeable headlight 10 would be connected to the electrical system of the motor vehicle 60 by using the power adapter 45, power plug 50 and power jack 55 or by using the auxiliary battery cable 57. The user would then remove the temporary rechargeable headlight 10 and repair the original headlight. The temporary rechargeable headlight 10 would then be charged and stored for future use.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A rechargeable headlight, comprising:
   a threaded body tapered along its length such that the front of the threaded body is narrower than the rear of the threaded body;
   a cylindrical battery housing attached to the rear of said threaded body;
   a rechargeable battery stored within said battery housing;
   a light module located at the front of the threaded body for emitting light; and,
   a switch located on the battery housing;
   wherein when said switch is activated power is applied to said light module which then emits light.

2. The rechargeable headlight according to claim 1, wherein said light module includes at least one LED.

3. The rechargeable headlight according to claim 1, wherein said power is from said rechargeable battery.

4. The rechargeable headlight according to claim 1, further including a power jack for applying power.

5. The rechargeable headlight according to claim 4, wherein said power is from said power jack.

6. The rechargeable headlight according to claim 4, wherein power is from said power jack recharge said rechargeable battery.

7. The rechargeable headlight according to claim 1, wherein said threaded body includes coarse outer threads disposed along its length.

* * * * *